US007406032B2

(12) United States Patent
Li et al.

(10) Patent No.: US 7,406,032 B2
(45) Date of Patent: Jul. 29, 2008

(54) BANDWIDTH MANAGEMENT FOR MPLS FAST REROUTING

(75) Inventors: Guangzhi Li, Kearny, NJ (US); Dongmei Wang, Kearny, NJ (US)

(73) Assignee: AT&T Corporation, Bedminster, NJ (US)

( * ) Notice: Subject to any disclaimer, the term of this patent is extended or adjusted under 35 U.S.C. 154(b) by 610 days.

(21) Appl. No.: 11/030,386

(22) Filed: Jan. 6, 2005

(65) Prior Publication Data

US 2006/0146696 A1 Jul. 6, 2006

(51) Int. Cl.
*H04L 12/26* (2006.01)

(52) U.S. Cl. .................. 370/217; 370/221; 370/225

(58) Field of Classification Search ............... 370/216, 370/217, 218, 221, 225, 395.21, 395.32
See application file for complete search history.

(56) References Cited

U.S. PATENT DOCUMENTS

| 6,628,649 | B1 | 9/2003 | Raj |
| 6,704,279 | B2 | 3/2004 | Klink |
| 7,124,187 | B1 * | 10/2006 | Kodialam et al. .......... 709/226 |
| 7,230,913 | B1 * | 6/2007 | Vasseur et al. ............ 370/216 |
| 2002/0067693 | A1 * | 6/2002 | Kodialam et al. .......... 370/216 |
| 2002/0112072 | A1 * | 8/2002 | Jain ...................... 709/239 |
| 2003/0009582 | A1 * | 1/2003 | Qiao et al. ............... 709/229 |
| 2003/0126287 | A1 * | 7/2003 | Charny et al. ............ 709/239 |
| 2003/0152024 | A1 * | 8/2003 | Yang et al. .............. 370/216 |
| 2003/0212927 | A1 | 11/2003 | Navar |
| 2003/0229807 | A1 | 12/2003 | Qiao |
| 2004/0013085 | A1 | 1/2004 | Klink |
| 2004/0052207 | A1 * | 3/2004 | Charny et al. ............ 370/216 |
| 2004/0193724 | A1 | 9/2004 | Dziong |
| 2004/0205237 | A1 | 10/2004 | Doshi |
| 2004/0205239 | A1 | 10/2004 | Doshi |
| 2005/0013242 | A1 * | 1/2005 | Chen et al. .............. 370/228 |
| 2005/0083928 | A1 * | 4/2005 | Sivabalan et al. ......... 370/389 |
| 2006/0029033 | A1 * | 2/2006 | Lee ...................... 370/351 |

FOREIGN PATENT DOCUMENTS

WO   WO 03/071745 A1   2/2003

OTHER PUBLICATIONS

Singer, "Cisco MPLS: The Bandwidth Protector", http://siliconvalley.internetnews.com/news/article.php/1478001, Oct. 7, 2002, 3 page(s), internetnews.com Duffy, "MPLS Feature Becoming SONET Alternative", http://www.nwfusion.com/edge/news/2002/1021mpls.html, Oct. 21, 2002, 2 pages, Network World Fusion: The Edge.

"Cisco MPLS Tunnel Builder Pro, Version 2.0: A New Paradigm for Providing Bandwidth Protection—Cisco MPPLS Bandwidth Protection", Brochure, Sep. 1, 2002, 4 pages, Cisco Systems.

* cited by examiner

*Primary Examiner*—Ricky Ngo
*Assistant Examiner*—Wei-Po Kao
(74) *Attorney, Agent, or Firm*—Michael Haynes PLC; Michael N. Haynes

(57) ABSTRACT

Certain exemplary embodiments provide a method comprising: in a network at a node located on a label switched path: selecting a backup path to respond to a failure; and for each link along the backup path, reserving a backup bandwidth, wherein the backup bandwidth is sufficient to reroute traffic around the failure.

1 Claim, 11 Drawing Sheets

LSP  ⟶

Backup Paths  ---▶

7000

BANDWIDTH MANAGEMENT FOR MPLS FAST REROUTING

BACKGROUND

A wide variety of potential embodiments will be more readily understood by those skilled in the art. Digital communications have become pervasive with the advent of computer networks, including the most familiar network, the Internet. Computer networks such as the Internet can be categorized as mesh networks wherein at least some nodes connect via links to a plurality of other nodes. For digital data, bandwidth is typically measured in bits per unit of time, such as bits per second (bps). Service providers can use Internet Protocol/Multiple Protocol Label Switching (IP/MPLS) on networks for applications that can utilize a large amount of bandwidth such as voice over IP, streaming video, streaming audio, video teleconferencing, and/or on-line games, etc. MPLS communication involves determining a label switched path (LSP) over which traffic is initially routed.

Labels can be placed on each packet such that data can be transferred without recalculating a new label switched path at each node on the label switched path (or service path) as packets are passed from a source node to a destination node of the label switched path. Once the label switched path is determined from the source node to the destination node, absent a failure in the network, packets can be labeled and passed along the label switched path without changes to the headers or packet routing.

Dealing with network failures can be an important consideration to satisfying customers of service providers using MPLS as a signaling standard for traffic. Network users desire communications that appear to be uninterrupted and clear. Thus, systems that provide low hardware overhead, fault tolerance, and path recovery that take place quickly enough to not be noticeable by users can be desirable for MPLS systems.

BRIEF DESCRIPTION OF THE DRAWINGS

A wide variety of potential embodiments will be more readily understood through the following detailed description, with reference to the accompanying drawings in which.

DETAILED DESCRIPTION

Figure 1:
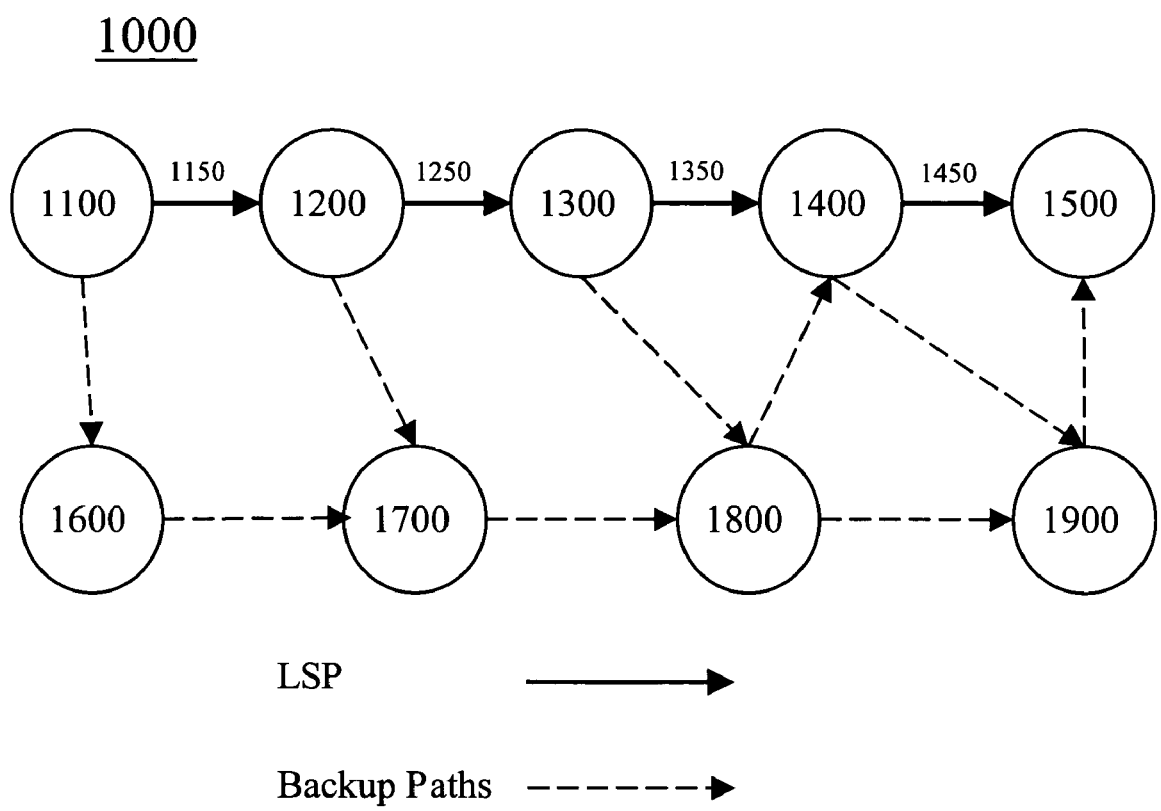
FIG. 1 is a block diagram of an exemplary embodiment of a network with fast reroute restoration 1000.

As used herein, the term "network" means a communicatively coupled plurality of communication devices. Examples include wired and/or wireless communications networks, such as public, private, circuit-switched, packet-switched, connection-less, virtual, radio, telephone, POTS, non-POTS, PSTN, non-PSTN, cellular, cable, DSL, satellite, microwave, twisted pair, IEEE 802.03, Ethernet, token ring, local area, wide area, IP, Internet, intranet, wireless, Ultra Wide Band (UWB), Wi-Fi, BlueTooth, Airport, IEEE 802.11, IEEE 802.11l, IEEE 802.11b, IEEE 802.11g, X-10, and/or electrical power networks, etc., and/or any equivalents thereof.

Digital communications have become pervasive with the advent of computer networks, including the most familiar network, the Internet. As used herein, the term "node" means in networks, a processing location. A node can be an information device, router, switch, gateway, hub, and/or multiplexer, etc. As used herein, the term "link" means a communicative connection (physical and/or logical) between two network nodes. Computer networks such as the Internet can be categorized as mesh networks wherein at least some nodes connect via links to a plurality of other nodes. As used herein, the term "bandwidth" means an amount of transmitted data that a link can convey in a fixed amount of time. For digital data, bandwidth is typically measured in bits per unit of time, such as bits per second (bps).

As used herein, the term "IP" (Internet Protocol) means a network protocol that specifies the format of packets, also called datagrams, and the addressing scheme for the packets. As used herein, the term "message" means a communication. By itself, IP is a protocol for providing a message from one communicator to another. As used herein, the term "IP network" means a network that uses an IP protocol for data communications. As used herein, the term "Multiple Protocol Label Switching (MPLS)" means a standard for network communications. In a network using MPLS, as an IP data stream enters the edge of the network, the ingress node reads a full address of data packet and attaches a small "label" in the packet header, which precedes the packet. Once the "label" is added, the data stream can be routed relatively quickly to a destination node along a specific label switched path (LSP).

Service providers can use Internet Protocol/Multiple Protocol Label Switching (IP/MPLS) on networks for applications that can utilize a large amount of bandwidth such as voice over IP, streaming video, streaming audio, video teleconferencing, and/or on-line games, etc. As used herein, the term "path" means a communicatively coupled collection of devices and links in a network. As used herein, the term "label switched path (LSP)" means a specific path through a network that data follows through a mesh network.

Data packets communicated using a label switched path comprise MPLS labels that comprise label switched path information. As used herein, the term "traffic" means data being transmitted via a network. MPLS communication involves determining a label switched path (LSP) over which traffic is initially routed. As used herein, the term "service" means an activity provided for the benefit of another. For example, a "service path" is a path adapted to provide transmission of data over a selected label switched path for the benefit of a user transmitting and/or receiving the data. Labels can be placed on each packet such that data can be transferred without recalculating a new label switched path at each node on the label switched path (or service path) as packets are passed from a source node to a destination node of the label switched path. As used herein, the term "determined" means ascertained, obtained, and/or calculated. As used herein, the term "failure" means a cessation of proper functioning or performance.

Once the label switched path is determined from the source node to the destination node, absent a failure in the network, packets can be labeled and passed along the label switched path without packet rerouting. As used herein, the term "signal" means detectable transmitted energy that can be used to carry information. Dealing with network failures can be an important consideration to satisfying customers of service providers using MPLS as a signaling standard for traffic. Network users desire communications that appears to be uninterrupted and clear. Thus, systems that provide fault tolerance and path recovery that take place quickly enough to not be noticeable by users can be desirable for MPLS systems.

Thus, rapid restoration of communications responsive to a failure can be a consideration in operative embodiments of IP/MPLS communications systems. As used herein, the term "backup" means reserve, or standby. As used herein, the term "backup path" means a reserve or standby data path in a mesh network adapted for use in event of a failure in a label switched path.

As used herein, the term "fast reroute" means a scheme of restoration in MPLS network. MPLS fast reroute can, in certain embodiments, reroute traffic onto predetermined backup paths within 10 s of milliseconds after detecting a failure. Systems switching MPLS traffic that quickly can provide service to users wherein failures appear to be relatively unnoticeable. As used herein, the term "predetermined" means established in advance. Predetermined signaling extensions can be used in support of MPLS fast rerouting backup path creation. A path merging technique can be used to share the bandwidth on common links among a label switched path and backup label switched paths created to reroute traffic around predetermined failures on the label switched path. As used herein, the term "reroute" means to switch to a backup path. MPLS fast reroute achieves rapid restoration by computing and signaling backup label switched path (LSP) in advance and re-directing traffic as close to failure point as possible.

As used herein, the term "restoration bandwidth" means an amount of communication capacity on a link to reroute network traffic around a failure. In certain exemplary IP/MPLS networks, restoration bandwidth can be managed in a distributed fashion. Optimized restoration paths can be selected on each node of the label switched path independently. In certain exemplary embodiments, bandwidth for backup paths can be shared among any label switched paths and backup label switched paths that are failure disjoint for MPLS fast reroute. As used herein, the term "reserved" means to set aside for a future purpose. Pre-established backup label switched paths need not consume bandwidth until a failure happens, yet enough restoration bandwidth can be reserved to guarantee that all affected label switched paths can be restored in the event of any single predetermined failure. As used herein, the term "necessary" means needed to satisfy.

Without bandwidth sharing among backup label switched paths for different label switched paths, the network might need to reserve much more bandwidth on its links than would be necessary for label switched path traffic. Certain exemplary embodiments comprise a distributed bandwidth management approach for MPLS fast reroute for bandwidth sharing among any label switched paths and backup label switched paths. Certain exemplary embodiments can be based on the observation that the restoration bandwidth can be shared by multiple backup label switched paths so long as label switched path segments are not susceptible to simultaneous failure. As used herein, the term "selection" means adapted to choose an item. A backup path selection algorithm can act to maximize the bandwidth sharing. Certain exemplary embodiments do not conflict with IETF standards for MPLS fast rerouting.

Distributed bandwidth management and backup path selection can be determined responsive to link usage information that is distributed throughout the network. As used herein, the term "information" means data that has been organized to express concepts. Some bandwidth related information can be provided to network nodes by current link state routing protocol extensions. Signaling protocol extensions can be used to distribute certain information among network nodes. In certain exemplary embodiments, the overhead of distributing the additional link information can be scalable. Certain exemplary embodiments comprise label switched path restoration in the event of a single failure. The single failure constraint can be reasonable since a backup label switched path is likely to be used only for a short time until the failure is repaired or a new label switched path is established. As used herein, the term "flooding" means broadcasting a message to a plurality of network nodes. Certain exemplary embodiments can communicate information used for bandwidth management without extra link state information flooding the network via a routing protocol. Instead, information gathering can be distributed via signaling extensions.

Bandwidth efficiencies can be evaluated by simulating a typical US intercity backbone network. Simulations can be based on an exemplary network topology and a traffic pattern typically experienced in intercity communications. As used herein, the term "reduce" means decrease in magnitude. Simulation results demonstrate that shared bandwidth management can reduce the amount of reserved restoration bandwidth to an overbuild level of approximately 60% in an exemplary application. Reducing the amount of reserved restoration bandwidth can result in relatively low system costs. Certain exemplary bandwidth management schemes can be suitable for use in real IP/MPLS networks.

As used herein, the term "delete" means remove and/or erase from a memory.

As used herein, the term "memory" means a device capable of storing analog or digital information. The memory can be coupled to a processor and can store instructions adapted to be executed by processor according to an embodiment disclosed herein. Certain exemplary embodiments can establish and/or delete backup paths as label switched paths come and go in a distributed MPLS network. Network capacity can be managed in a distributed way such that label switched paths can share bandwidth on common links with backup paths created to reroute traffic around failures associated with the label switched path. In certain exemplary embodiments backup paths can share bandwidth with other failure disjoint backup paths for other label switched paths.

As used herein, the term "value" means an assigned or calculated numerical quantity. In certain exemplary embodiments, the network can comprise any number of nodes. For example, nodes in the network can number such as from approximately 5 to approximately 10 million or more nodes, including all values therebetween (e.g., 7, 23, 976, 1109, 34,569, and/or 567,999, etc.) and all subranges therebetween. To reroute network traffic around any single network failure on a label switched path that traverses N nodes, there can be as many as N-1 backup paths.

In certain exemplary embodiments, a backup label switched path bandwidth can be shared between the backup path and the label switched path. When a backup path intersects the label switched path at a node with the same outgoing interface (e.g., port, logical channel, etc.), the bandwidth of the backup path can be merged with the bandwidth of its label switched path for bandwidth reservation purposes. When two backup paths that have been created to reroute traffic for the same label switched path travel a common link in the same direction, the reserved bandwidths of the two backup paths can be shared since they are rerouting traffic around different failure scenarios, and thus, the bandwidth of one of the two backup paths can be ignored, such that the reserved bandwidth is less than the combined reserved bandwidths of the two backup paths and/or is equal to the larger of the two reserved bandwidths. When a failure occurs along the label switched path, the upstream node close to the failure point can detect the failure and can re-direct traffic around the failure point onto a backup path.

FIG. 1 is a block diagram of an exemplary embodiment of a network 1000. The network comprises nine nodes for illustrative purposes. An exemplary embodiment of a label switched path on network 1000 can comprise five nodes and can have four backup paths.

In FIG. 1 an LSP can be defined as:
1100 to 1200 to 1300 to 1400 to 1500.

A plurality of backup paths can be defined as:

| Failure Point | Path |
| --- | --- |
| 1150 or 1200 | 1100 to 1600 to 1700 to 1800 to 1400 to 1500 |
| 1250 or 1300 | 1100 to 1200 to 1700 to 1800 to 1400 to 1500 |
| 1350 or 1400 | 1100 to 1200 to 1300 to 1800 to 1900 to 1500 |
| 1450 | 1100 to 1200 to 1300 to 1400 to 1900 to 1500 |

Thus, if node 1300 fails, node 1200 can detect the failure and can redirect traffic along a backup path originating at node 1200. Network traffic can travel along a path from 1100 to 1200 to 1700 to 1800 to 1400 to 1500. Since node 1200 might not distinguish a failure of link 1250 from a failure of node 1300, the backup path originating at node 1200 can exclude node 1300. Although backup label switched paths need not actually use bandwidth before failure, enough bandwidth can be reserved at each node along backup label switched path links to allow for rerouting traffic responsive to the failure.

In certain exemplary embodiments, a MPLS network can be represented by a graph comprising a plurality of network nodes and a plurality of network links. As used herein, the term "request" means a message asking for something. Requests for backup bandwidth to reroute traffic in the event of a failure on the label switched path can originate at clients and arrive at the source nodes and can be established or deleted in a distributed manner, via signaling among nodes. As used herein, the term "downstream" means in a direction away from a node on a unidirectional link. As used herein, the term "immediately downstream" means separated in a mesh network by no more than one link. For example, a link is immediately downstream of a first node when the link is directly communicatively coupled to the first node and on a unidirectional path exiting from the first node. A second node is immediately downstream of the first node if it is downstream of the first node and communicatively coupled to the first node by a single link. A failure immediately downstream of a first node can comprise a failure of the link and/or the second node.

For each label switched path request, a source node can compute a label switched path and each node except the destination node along the label switched path can compute a backup path adapted to reroute data traffic around a failure immediately downstream of each respective node on the label switched path. As used herein, the term "unidirectional" means in a single direction only. The backup path can comprise bandwidth allocated to reroute traffic around a failure of a predetermined node or a predetermined link immediately downstream of each respective node.

In general, multiple label switched paths can share common network resources, hence a single network resource failure, such as link failure or node failure, can cause multiple label switched paths to fail simultaneously. Design objectives for a label switched path and a plurality of backup paths associated with the label switched path can be:

- each backup path can be disjoint of the immediately downstream link or the immediately downstream node of the particular node;
- bandwidths associated with different backup paths adapted to reroute traffic from the label switched path can be shared if they share a common link;
- backup label switched paths from different label switched paths can share bandwidth on common links if their respective label switched path failure points are not subject to simultaneous failure;
- enough bandwidth can be reserved on all links in the network such that for any single failure, there is enough bandwidth to restore all affected label switched paths; and
- the total bandwidth reserved for restoration over the whole network can be minimized in order to minimize network costs.

As used herein, the term "optimized backup path" means a continuous series of connected devices in a network not comprising a predetermined device around which network traffic will be rerouted in event that the predetermined device fails, the continuous series of connected devices selected as using and/or requiring fewer network resources as compared to alternate paths. In certain exemplary embodiments, network nodes can manage resources in a distributed manner to reroute network traffic in event of a network failure, reserve restoration capacity on links, and compute optimized backup paths. Since label switched path requests can arrive one at a time at a source node, the source node and the nodes along the label switched path can make routing decisions without knowledge of future requests.

Figure 2:
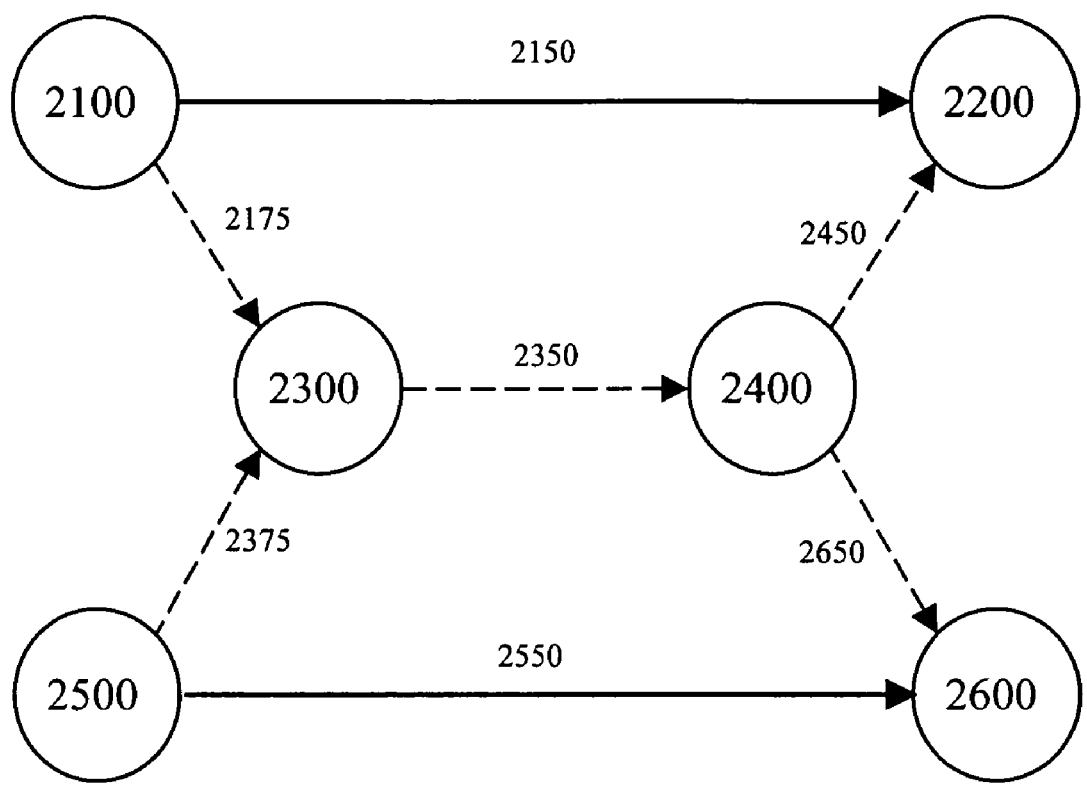
FIG. 2 is a block diagram of an exemplary embodiment of a network with backup bandwidth sharing 2000.

FIG. 2 is a block diagram of an exemplary embodiment of a network 2000, which comprises six nodes and seven links. A first LSP can be defined as:
2100 to 2200.

A backup path can be defined as:

| Failure Point | Path |
| --- | --- |
| 2150 | 2100 to 2300 to 2400 to 2200 |

Suppose a request for a first label switched path arrives at node 2100 and asks for one unit of bandwidth on link 2150. In preparing for a failure of link 2150, node 2100 can select a path 2100 to 2200 for a label switched path and 2100 to 2300 to 2400 to 2200 for a backup path. When the first label switched path is established, one unit of bandwidth can be allocated on link 2150, and one unit of bandwidth can be reserved on each of links 2175, 2350, and 2450. Subsequently, a second label switched path can be requested as:
2500 to 2600.

In creating the label switch path, one unit bandwidth can be allocated on link 2550. A backup path can be defined as:

| Failure Point | Path |
|---|---|
| 2550 | 2500 to 2300 to 2400 to 2600 |

Node 2500 can select the path 2500 to 2600 for service path of the second label switched path and 2500 to 2300 to 2400 to 2600 as a backup path of the second label switched path. In this exemplary embodiment, when setting up the second label switched path, it is unnecessary to reserve an additional unit of bandwidth on link between node 2300 and node 2400 because the two label switched paths, 2100 to 2200 and 2500 to 2600, are failure disjoint, i.e., they are assumed not to be subject to simultaneous failure. Thus, a total of five units of bandwidth can be reserved to reroute traffic associated with both label switched paths in event of any single link failure whereas without shared reservations, a total of six units of bandwidth would be needed. Sharing reserved bandwidths among backup paths of different label switched paths can reduce total reserved bandwidths.

In MPLS networks, a link state routing protocol, such as Open Shortest Path First protocol (OSPF) or Intermediate System-Intermediate System protocol (IS-IS), can be used to distribute network topology information to each node in a particular network routing domain. Traditionally, these protocols have propagated link up/down status information among the nodes. To support path computation in MPLS networks, both OSPF and IS-IS can be extended to propagate additional information about each link, such as available bandwidth, bandwidth in service, and/or bandwidth reserved, etc. The additional information can be used to select a label switched path for each label switched path request. In certain exemplary embodiments, some algorithms that are adapted to select backup paths can use extra information that can be carried by routing and signaling protocols.

As used herein, the term "Dijkstra's algorithm" means a method for finding a lowest cost path from a first network node to a second network node. The method comprises initializing a total path cost array and a nodes checked array. The method comprises recursively visiting nodes and tracking costs for each possible path being traversed toward the second network node. Each path is extended based upon whether or not the path presently has the lowest cost as compared to other partial paths being traversed as candidates for the lowest cost path. As used herein, the term "weight" means a value assigned to denote a relative desirability of use. Many path selection algorithms in current networks are based on Dijkstra's algorithm, which can select a path of minimum weight among all suitable paths. The assignment of link weights can control path selection. In certain exemplary embodiments, weights used to compute backup paths can take into account shared restoration bandwidth.

In certain exemplary embodiments, link state information that can be flooded by a routing protocol can comprise:
  service bandwidth: the bandwidth used by label switched paths on each unidirectional link;
  reserved bandwidth: the bandwidth that is not used on a unidirectional link when the network is in a non-failure condition, but can be used to reroute traffic around the failure;
  available bandwidth: the bandwidth that is not committed and therefore can be allocated to service bandwidth and/or reserved bandwidth as new label switched path requests arrive;
  administrative weight: a quantity that can be set by the network operator and can be used as a measure of a heuristic "cost" to the network. A path with a smaller total weight is typically preferred over a path with a larger total weight.

Link state information can be communicated via extensions of OSPF/IS-IS for MPLS. A label switched path can be selected as a shortest path based on administrative weights. As used herein, the term "sufficient" means adequate. In certain exemplary embodiments a bookkeeping system can keep track of bandwidth used and reserved on each unidirectional link in a distributed manner such that there is only necessary but sufficient bandwidth reserved on each link. Certain exemplary embodiments can collect information to select optimized backup paths to minimize total reserved restoration bandwidths over all network links. For each link, there can be a bandwidth reserved in both directions. Since each link connects two nodes, each node can be responsible for keeping track bandwidth information of the outgoing direction of the link from the node.

As used herein, the term "Failother" means an array name. In certain exemplary embodiments the Failother array can comprise values indicative of bandwidths for rerouting traffic on a predetermined unidirectional link if respective failures occur. For each link direction, a responsible node can maintain a local array Failother[j], where j is any possible failure point. Failother[j] can be the amount of bandwidth on a link direction to restore all failed label switched paths if failure j occurs. As used herein, the term "reserving" means an act of setting aside for future use.

Reserving a bandwidth equal to R=max {Failother[j]} where j can range over all predetermined possible failures can provide sufficient and necessary bandwidth reserved to reroute traffic around any single predetermined failure. In certain exemplary embodiments, a bandwidth can be selected that is less than the maximum value in the failother array if certain bandwidths exceed a predetermined threshold for which backup paths can be provided. The bandwidth can be distributed to other network nodes using an extended routing protocol. When a backup path is selected, a signaling message carrying possible failure points that traffic can be routed around (immediately downstream link and immediately downstream node) on the label switched path can be sent along the backup path. As used herein, the term "sending" means transmitting via a communication path. Sending the signaling message can allow responsible nodes along a backup path to automatically update corresponding Failother[j] entries for each link in a distributed way. As used herein, the term "deletion" means removal and/or erasure from a memory. During a lifecycle of a label switched path, possible operations can comprise creation and deletion of the label switched path.

When a source node receives a label switched path request, the source node can compute a label switched path using constrained shortest path first algorithm (CSPF) with administrative weights and available bandwidth of each unidirectional link. As used herein, the term "RSVP" means a standard designed signaling protocol to support link reservations on networks of varying topologies and media. Through RSVP, a user's quality of service requests can be propagated to all nodes along a data path, allowing the network to reconfigure itself to meet a desired level of service. Using RSVP Traffic Engineering (RSVP-TE) extensions can allow signaling messages to be explicitly routed from a source to a destination. Similar extensions can be defined for constraint-based routing label distribution protocol (CR-LDP).

Label switched path creation can involve an initial signaling message (e.g., a PATH message) from a source node to a destination node with admission control along the computed label switched path, then a bandwidth reservation message (e.g., a RESV message) can be returned from the destination node to the source node to finish establishment of a label switched path. Upon receiving the RESV message, each node along the label switched path can select a backup path to the destination node by excluding the immediately downstream node and applying constrained shortest path first algorithm.

Each respective node can send a signaling message along the selected backup path to establish the backup label switched path and reserve sufficient shared restoration bandwidth. The signaling message can include the immediately downstream link and immediately downstream node information on the label switched path. The immediately downstream link and immediately downstream node information can be used to maintain shared reservations at each unidirectional link along the backup path. A responsible node of unidirectional link along the backup path can update the Failother array as follows: Failother[j]←Failother[j]+b where j is the immediately downstream link and immediately downstream node on the label switched path and b is the requested bandwidth of the label switched path.

Implementing certain exemplary embodiments can involve a consistent assignment of network link identifiers and node identifiers by network nodes. Since link state routing can give each node a consistent view of a network topology, each link can be indexed by hashing respective node identifiers of two end points of a respective link in a standardized way. Another possible solution can be for a network provider to provide a globally unique link identifier for each link.

Figure 3:
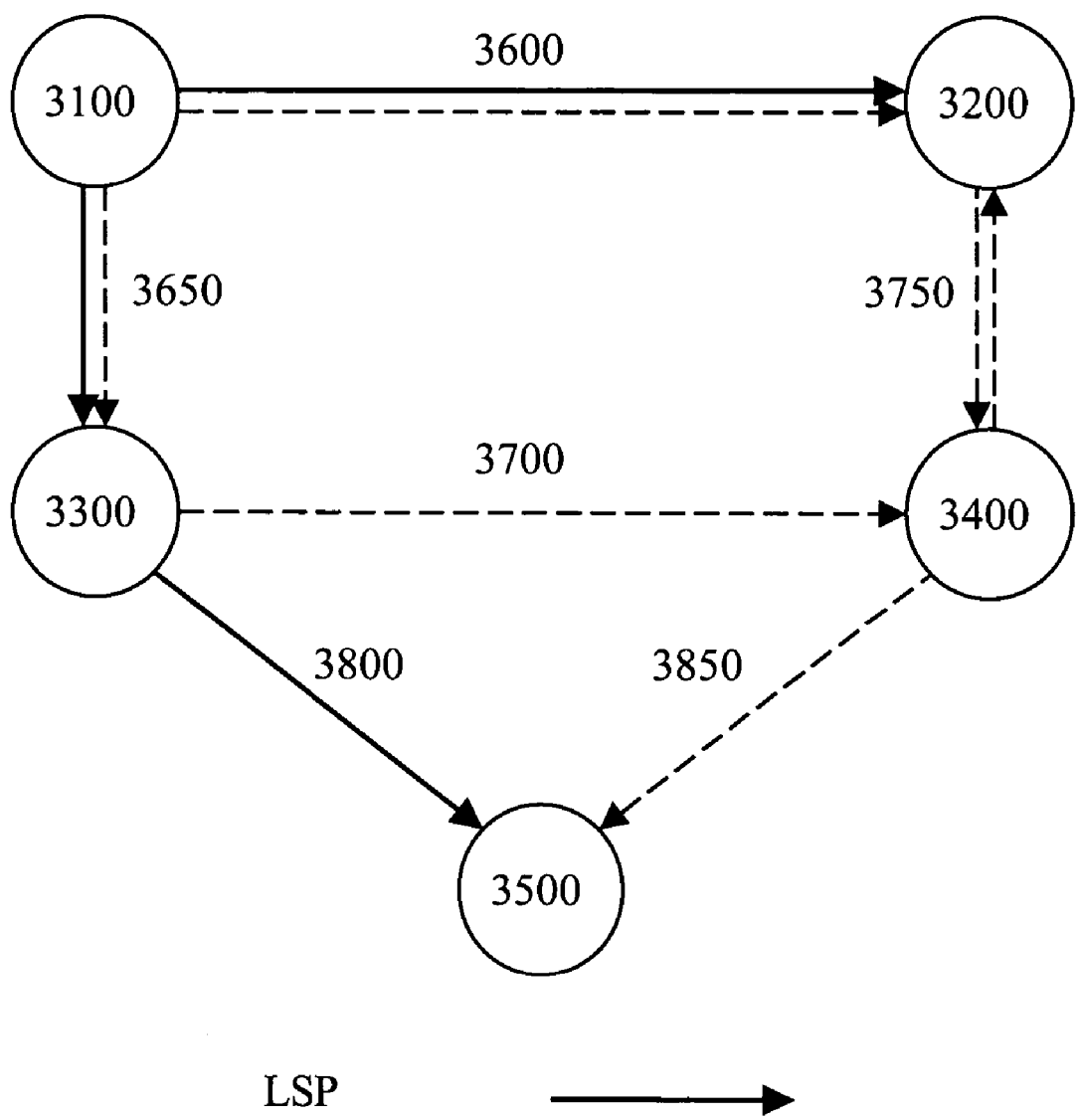
FIG. 3 is a block diagram of an exemplary embodiment of a network with fast reroute creation procedure 3000.

FIG. 3 is a block diagram of an exemplary embodiment of a network 3000 that comprises five nodes and six links. A first label switched path of 3100 to 3200 on link 3600 can consume one unit of bandwidth. An associated backup path to reroute traffic around a failure of link 3600 can be 3100 to 3300 to 3400 to 3200. Now suppose node 3100 receives a request for a second label switched path between 3100 and 3500 with a bandwidth of one unit. At this time, node 3100 can have information regarding the network topology with reservation information wherein bandwidth reserved on links 3650, 3700, and 3750 are each one unit and the reserved bandwidth on other unidirectional links is all zero.

Node 3100 first can compute a label switched path, 3100 to 3300 to 3500 along which a first message, such as a PATH message, can be sent. When node 3500 receives the first message, it sends out a responsive second message, such as a RESV message, along the reverse path from node 3500 to node 3100 to establish the label switched path. After node 3300 receives the second message, node 3300 can compute a backup path adapted to reroute traffic around link 3800 in event of a failure thereof. The backup path can be computed using the CSPF algorithm. The computed backup path can be 3300 to 3400 to 3500. Node 3300 can send a reservation message including information regarding downstream link 3800, along 3300 to 3400 to 3500. The reservation message can comprise information adapted to establish the backup path 3300 to 3400 to 3500. Each responsible node of unidirectional links 3700 and 3850 along the backup path can update respective Failother arrays correspondingly.

After node 3100 receives the second message, node 3100 can compute the backup path adapted to reroute traffic around the downstream link 3650 and downstream node 3300 if a failure of either or both occurs. The backup path can be computed using the CSPF algorithm, which can be 3100 to 3200 to 3400 to 3500. Node 3100 can send a reservation message, along 3100 to 3200 to 3400 to 3500 to establish the backup path. The message can comprise information regarding downstream link 3650 and downstream node 3300. Each responsible node of unidirectional links along the backup path can update a respective Failother array correspondingly. In this embodiment, backup paths 3200 to 3400 to 3500 and 3100 to 3200 to 3400 to 3500 can merge at node 3400. The backup scheme can comprise all messages reaching the destination node of the label switched path to update the Failother array in a distributed manner.

After the label switched path and associated backup paths are established and local arrays are updated, each node can also update available and reserved bandwidths for each unidirectional link. Changes for affected unidirectional links can be disseminated to other nodes via extended routing protocol OSPF or IS-IS. In the particular embodiment illustrated in FIG. 3, link status can comprise reserved bandwidths on the links 3650 (from 3100 to 3300), 3700 (from 3300 to 3400), 3750 (from 3400 to 3200), 3850 (from 3400 to 3500), 3600 (from 3100 to 3200), 3750 (from 3200 to 3400), and 3850 (from 3400 to 3500) of one unit of bandwidth. Similarly service bandwidths on links 3600, 3650, and 3800 for this particular embodiment can be one unit. Absent other label switched paths, service bandwidths and reserved bandwidths on other unidirectional links can be zero. Although both backup paths 3100 to 3200 to 3400 to 3500 and 3300 to 3400 to 3500 for different label switched paths use common unidirectional link 3700, only one unit of bandwidth typically will typically be reserved. This is because each of these two backup label switched paths can route traffic around two different predetermined failure points.

When a source node receives a label switched path deletion request, the network can delete the label switched path and its backup label switched paths, and release the reserved bandwidth for shared restoration. Because Failother arrays can be updated during LSP deletion, the deletion process can update these arrays in a distributed manner. Using the RSVP protocol with traffic engineering, the source node can send one PATH-TEAR message to a destination node of the label switched path along a defined label switched path. Each node along the label switched path can also send a PATHTEAR message along its respective backup path. PATHTEAR messages along backup paths can comprise immediately downstream link and/or immediately downstream node information such that the responsible nodes of each unidirectional link along the backup path can update the Failother array as follows: Failother[j]=Failother(k)[j]−b where j is the immediately downstream link and/or the immediately downstream node on the label switched path and b is the label switched path bandwidth. Updates to respective label switched path bandwidth and reserved path bandwidths can be handled similarly to label switched path creation.

Figure 4:
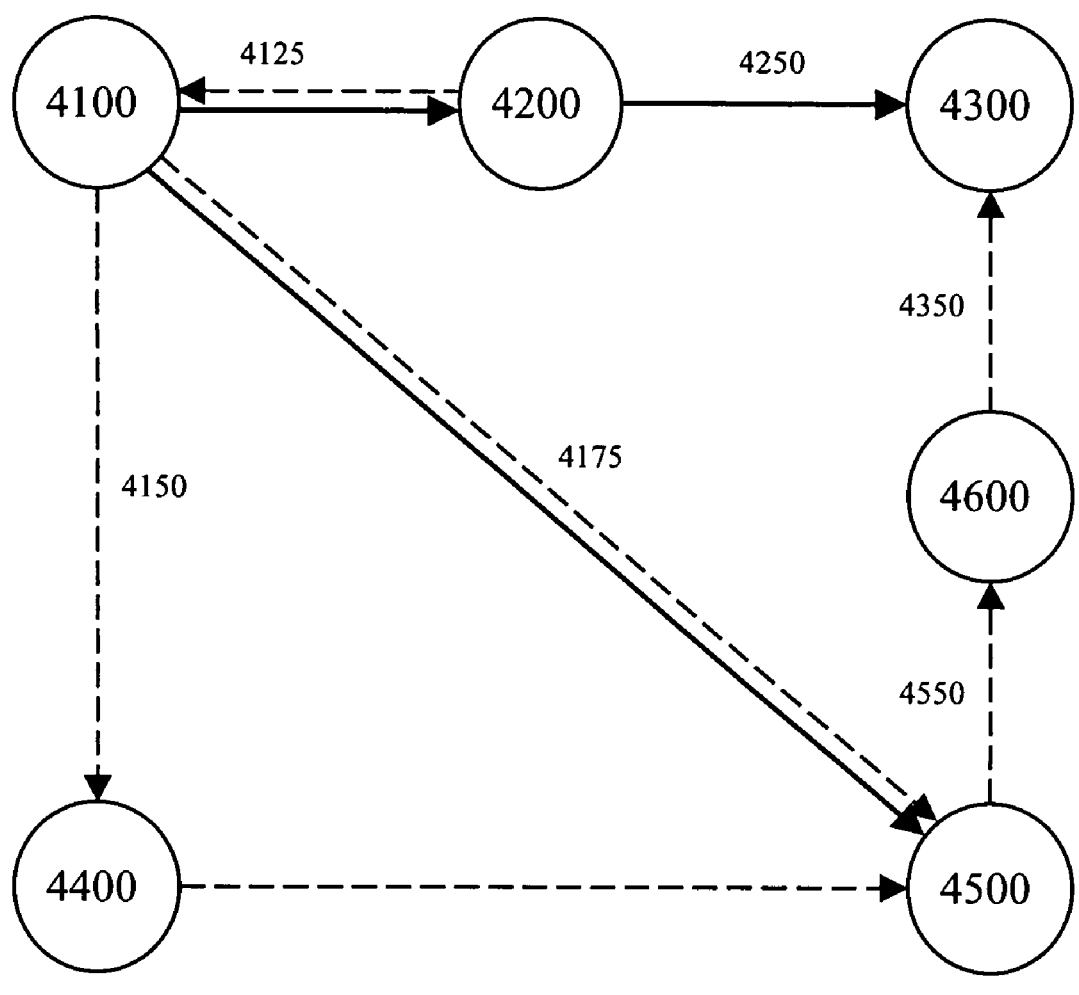
FIG. 4 is a block diagram of an exemplary embodiment of a network with optimized backup path selection 4000.

FIG. 4 is a block diagram of an exemplary embodiment of a network 4000 with six nodes and seven links. In certain exemplary embodiments, backup paths can be computed for each node on a label switched path except for a destination node. Since restoration bandwidth can be shared across backup paths, backup path selection can impact overall restoration bandwidths. Consider a label switched path using one unit of bandwidth from 4100 to 4500 and an associated backup path 4100 to 4400 to 4500. Node 4100 can receive another label switched path request for one unit bandwidth between node 4100 and node 4300. A label switched path can be computed as 4100 to 4200 to 4300. Node 4100 can select a shortest disjoint path 4100 to 4500 to 4600 to 4300 and node 4200 can select 4200 to 4100 to 4500 to 4600 to 4300 as their backup paths respectively. The total restoration bandwidth can be six units while 4100 can select another longer path 4100 to 4400 to 4500 to 4600 to 4300 as the backup path, and 4200 can select 4200 to 4100 to 4400 to 4500 to 4600 to 4300 as its backup path, the total restoration bandwidth can be five units only assuming that paths 4100 to 4500 and 4100 to 4200 to 4300 are failure disjoint.

A shortest path rerouting traffic around the immediately downstream node may not always lead to minimal bandwidth reservations for all backup paths. An optimized selection of backup paths can minimize total bandwidths reserved for backup paths. Certain exemplary embodiments can optimize label switched path selection to reduce the total bandwidth, including both label switched paths and backup paths. A longer label switched path can result in larger total bandwidth reservations for all label switched paths since label switched paths cannot be shared. Also longer label switched paths can lead to longer service delay. Certain exemplary embodiments assume that the label switched path for each label switched path request can be the shortest path from source node to destination node.

As used herein, the term "selecting" means choosing. To achieve a better backup path selection, a node selecting a backup path can use some extra information. To distribute and collect extra information on each node, certain exemplary embodiments can use signaling extensions between neighboring nodes. Signaling messages can comprise TELL, ASK and REPLY.

For a TELL message, after a node selects or deletes its backup path, the node can send the TELL message to the immediately downstream node with backup path information. For the ASK message, before a node selects its backup path, it can send an ASK message to its immediately downstream node and asks for extra information. For the REPLY message, when a node receives the ASK message, the node can reply with the requested information back to the node that sent the ASK message.

In certain exemplary embodiments, the ASK message information can be embedded in a PATH message during creation of the label switched path while a TELL message information can be embedded in a RESV message during the label switched path creation. Upon the label switched path deletion, the TELL message for backup deletion can be embedded in a PATHTEAR message.

As used herein, the term "master node" means a predetermined node that is responsible to maintain failure related information a particular link and/or failure. In certain exemplary embodiments, for each possible predetermined failure, a master node can be defined which can be responsible for maintaining failure related information. For a predetermined link failure, the master node can be the node terminating the link having a smaller node id while for a predetermined node failure; the master node can be the node itself. The master node of each failure along the label switched path can keep track of the bandwidth that has been reserved on other network unidirectional links to reroute traffic around the predetermined failure. As used herein, the term "Failself" means an array name. In certain exemplary embodiments the Failself array can comprise values indicative of bandwidths on respective unidirectional links to restore all affected label switched paths if a predetermined failure occurs. This information can be maintained in a local array in the master node, called Failself, where Failself[i] stores the bandwidth on unidirectional link i to restore all affected label switched paths if the predetermined failure occurs. Just like Failother arrays, a Failself array can be updated at each node during label switched path creation and deletion.

When the immediately downstream node receives a TELL message about backup label switched path creation, the immediately downstream node can update the Failself array for itself: Failself[i]=Failself[i]+b where i is a unidirectional link on the backup path and b is the bandwidth of the label switched path. If the immediately downstream node is also the master node of the immediately downstream link, the Failself array for the immediately downstream link can be updated in the same way. When the immediately downstream node receives a TELL message, independent or embedded, regarding backup label switched path deletion, the immediately downstream node can update the Failself array for itself: Failself[i]=Failself[i]−b, where i has a range over the links on the backup path and b is its bandwidth. Before a node selects a backup path, the node can send an ASK message to its immediately downstream node for Failself array information of the immediately downstream node and/or the immediately downstream link. The REPLY message can provide a correct Failself array of the immediately downstream node and information regarding the immediately downstream link if the node is the master node of the immediately downstream link. With Failself information, the node can be adapted to select a better backup path.

After a node along the label switched path collects the Failself array(s) from the immediately downstream node, the node can calculate a new array $T[i]=\max(\text{Failself}(DR)[i], \text{Failself}(DL)[i])$ where DR means the immediately downstream node and DL is the immediately downstream link, and i is any particular unidirectional link. As used herein, the term "maximum" means largest of a set. Then T[i] is the maximum bandwidth needed on unidirectional link i if any one of the DR and DL failures occurs. This computation can be based on the network state before the new backup label switched path is established. As used herein, the term "adjacent" means next to and/or nearby. After that, the node can assign a new weight to each unidirectional link in the network:

$$w[i] = \begin{cases} \min(b, T[i]+b-R[i]) \cdot W[i] & \text{if } T[i]+b-R[i] > 0 \text{ and } i \notin \{DR\} \\ \varepsilon & \text{if } (T[i]+b-R[i] \leq 0 \text{ or } i \in \{DP\}) \text{ and } i \notin \{DR\} \\ \infty & \text{if } i \in \{DR\} \end{cases}$$

where {DR} means the set of links adjacent to the immediately downstream node, which means the backup path should exclude this downstream router, and {DP} means the set of links downstream from the immediately downstream router along the label switched path. Then Dijkstra's algorithm can be used to select the backup path from the node to the destination node using these weights. In this formula, the assigned new weight of ε is in favor of the selection of particular links, which are downstream label switched path links for potential label switched path merging and links with enough existing restoration capacity. In both cases, no extra restoration capacity need be reserved on those links.

Certain operative embodiments can be used to evaluate system performances. For example, a particular operative model of a typical US intercity MPLS backbone network was tested that comprised 18-PoPs (Points-of-Presence) and 32 OC48-granularity links interconnected in a dual backbone router (BR) architecture. Access routers (ARs) were connected to the same PoP into a virtual AR. Each PoP comprised three nodes: two BRs and one AR. The AR-to-AR demands in this study were generated using cumulative outgoing and incoming traffic from a demand forecast, i.e., all traffic starting and terminating at the AR respectively. A random demand was selected according to source AR cumulative traffic outgoing probability and destination AR cumulative traffic incoming probability. The bandwidth of each demand was uniformly generated from an interval of 10 to 100 Mbps. For simplicity, the MPLS backbone link bandwidths was assumed to be deployed in units of OC48 channels (approx. X=2.5 Gpbs). In the simulation, an online incremental traffic model was used, i.e. traffic demands arrived at the network one by one, and never left. As used herein, the term "calculated" means computed. In this particular operative embodiment, twenty random runs were generated and the average value for each data point calculated.

A frequently used metric for evaluating restoration path algorithms is restoration overbuild, which is defined as a percentage of additional resources for backup paths over that for label switched paths without an ability to reroute traffic in event of a failure. Operative variables can comprise $\alpha=\Sigma SC(i)$ and $\beta=\Sigma TC(i)$, where i varies over all backbone links, where SC(i) is the required number of OC48 channels for service only on link i, and TC(i) is the total required OC48 channels for both service and restoration on link i. The restoration overbuild can be defined as $\Lambda=(\beta-\alpha)/\alpha$.

Another commonly used metric is restoration bandwidth-mileage overbuild, or product overbuild, which is the ratio of total restoration bandwidth-mileage product to the total service bandwidth-mileage product. For variables defined as $\delta=\Sigma(SC(i)*L(i))$ and $\phi=\Sigma(TC(i)*L(i))$, where L(i) is the length in miles of link i. Then $\Pi=(\phi-\delta)/\delta$ can be defined as the restoration bandwidth-mileage (product) overbuild.

Both $\Lambda$ and $\Pi$ metrics assume that each link has infinite bandwidth. In real networks, link bandwidth is limited. When a network is heavily loaded, some label switched path demands can be blocked due to insufficient bandwidth for either the label switched path or some backup paths. The number of blocked demands is another metric used to measure the network performance. Unless otherwise stated, all the data shown was based on single link/node failure only and was averaged over 20 different runs with different seeds.

For a first set of performance experiments, link capacities were set to infinity and label switched path demands were assumed to arrive one at a time. In the operative embodiments tested, the label switched paths were always routed along the shortest path. The backup paths were selected using immediately downstream node disjoint shortest paths to the destination node in the baseline scheme and enhancement I, while the backup paths in enhancement II are selected using modified link weight settings. The baseline scheme used only a merging technique for bandwidth sharing. Both enhancement I and enhancement II schemes used operative embodiments of distributed bandwidth management methods. Enhancement I selected disjoint shortest paths while enhancement II selected disjoint optimized shortest paths. The baseline test only shared bandwidth between a particular label switched path and the backup paths associated with the particular label switched path. The illustrated enhancement schemes are able to share bandwidth among any label switched paths and backup label switched paths. After all label switched paths were routed on the network, the restoration overbuild and restoration product overbuild was calculated for each of the schemes.

Figure 5:
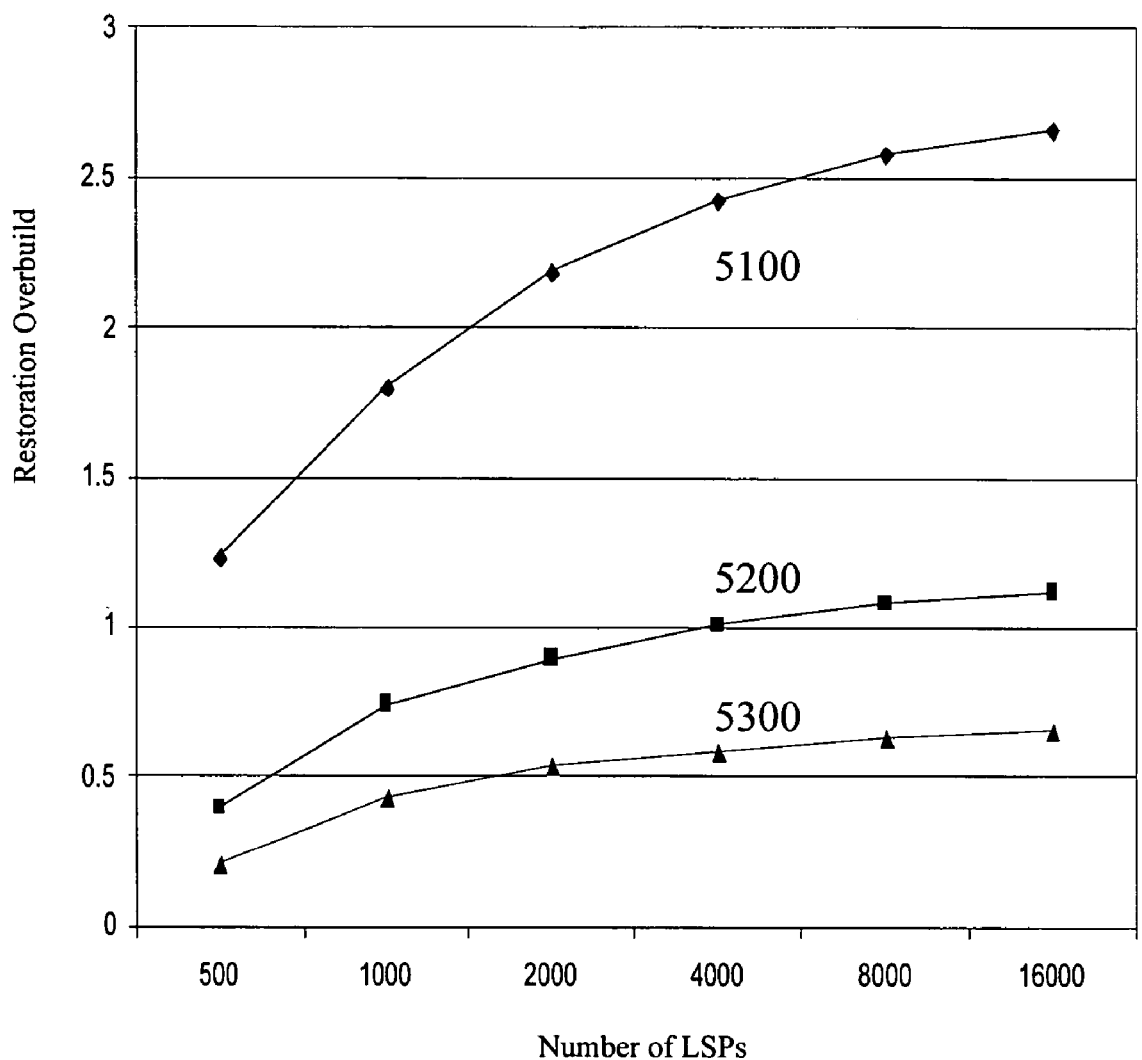
FIG. 5 is a performance graph 5000 relating to an operative embodiment.

FIG. 5 is a performance graph 5000 relating to an operative embodiment that illustrates the average restoration overbuild for each of the three schemes tested. Each algorithm is compared with the same traffic demands ranging from 500 to 16000 label switched paths. The baseline scheme results are shown as line 5100. The results from the scheme denoted as enhancement I are shown as line 5200. The results from the scheme denoted as enhancement II are shown as line 5300. Both enhancements used significantly fewer restoration overbuilds than the baseline scheme and enhancement II used the least resources.

Enhancement I performed more than 100% better than the baseline scheme in restoration overbuild and enhancement II used about half of the overbuild of enhancement I. Enhancements operated on each node in a distributed manner with no centralized server. Enhancement I was implemented using Failother arrays. The enhancement II was implemented using both Failother and Failself arrays.

Figure 6:
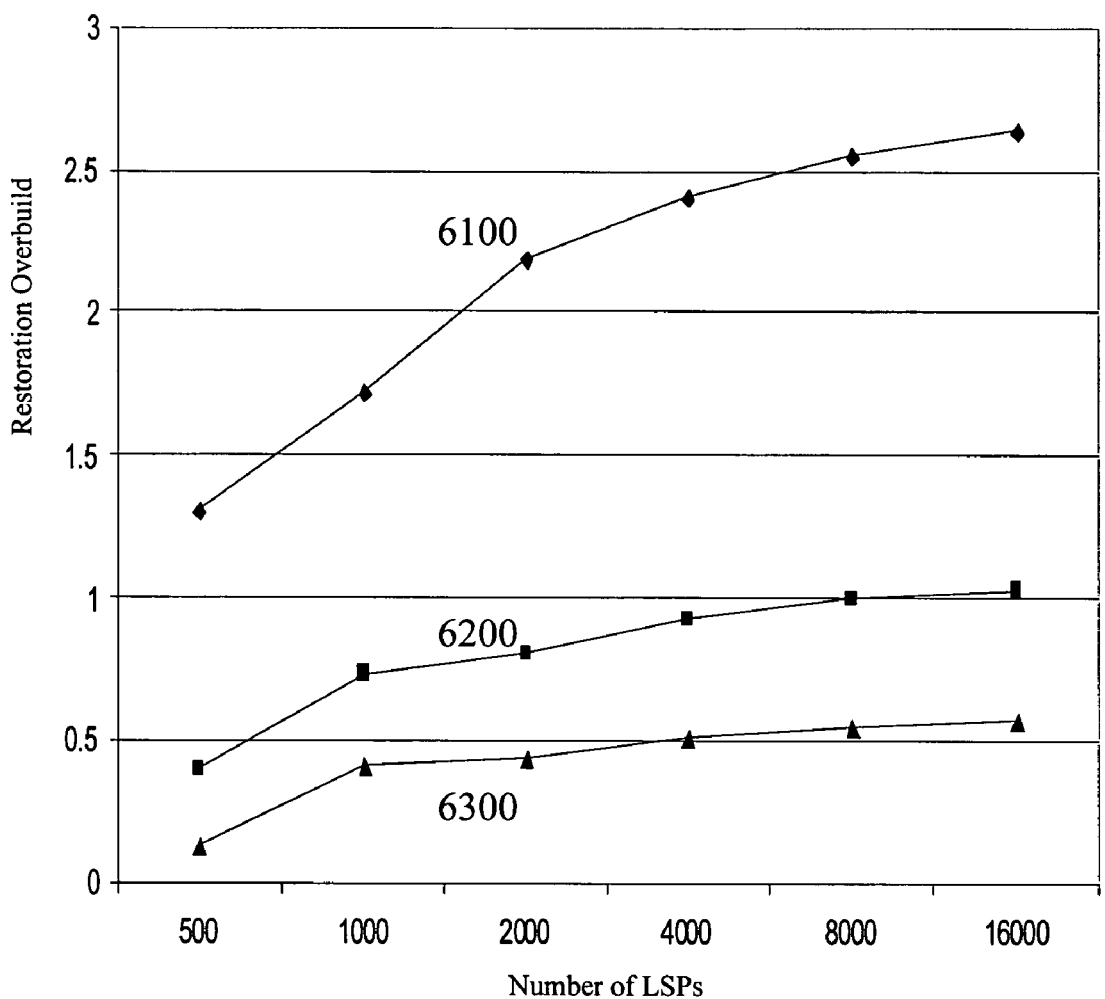
FIG. 6 is a performance graph 6000 relating to an operative embodiment.

FIG. 6 is a performance graph 6000 relating to an operative embodiment that depicts the restoration bandwidth-mileage product overbuild. The baseline scheme results are shown as line 6100. The results from the scheme denoted as enhancement I are shown as line 6200. The results from the scheme denoted as enhancement II are shown as line 6300. Again, enhancement I reduced overbuild by about 100% compared with the baseline scheme and enhancement II further reduced product overbuild by approximately 50% as compared with enhancement I.

A second set of performance experiments using of operative embodiments studied behaviors of baseline scheme and the two enhancements. Results were measured with respect to the number of blocked demands due to an overloaded network. In these simulation experiments, each link capacity was set to four OC48 channels (total 10 Gbps). Label switched path demands were chosen as described before. As demands were routed, and an accounting was kept of how much service bandwidth was used per link, as well as how much restoration bandwidth was reserved on each link for each failure. If there was insufficient available capacity for either the label switched path or one of the backup paths of an incoming label switched path request, then the request was recorded as blocked. The label switched path was chosen as the shortest path along links with available bandwidth by using a constrained shortest path first (CSPF) algorithm. Ten simulation runs were performed with different random number generator seeds.

Figure 7:
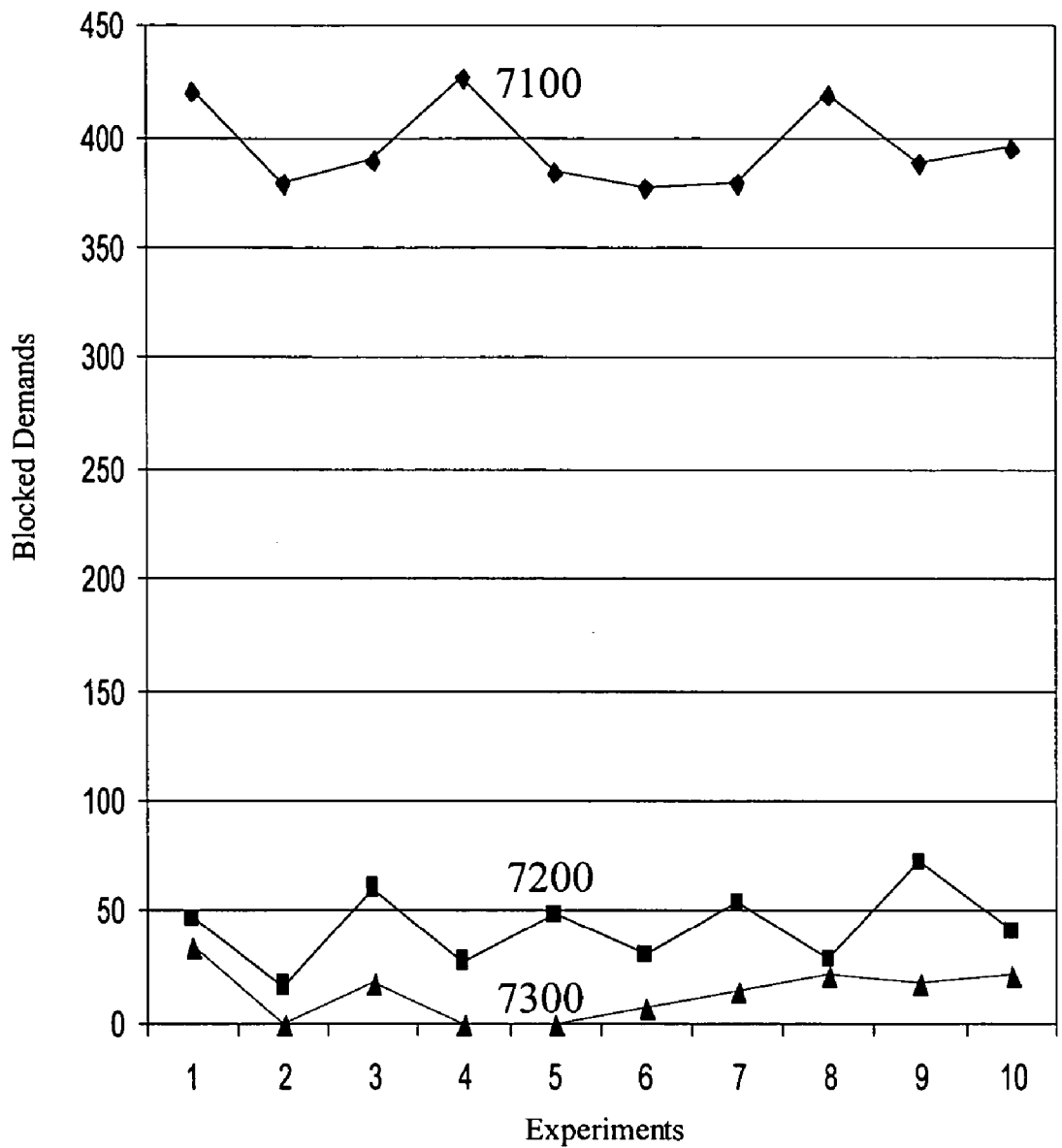
FIG. 7 is a performance graph 7000 relating to an operative embodiment.

FIG. 7 is a performance graph 7000 relating to an operative embodiment that shows the number of demands blocked after 1200 demands were loaded onto the network for each of the different fast reroute schemes. The baseline scheme results are shown as line 7100. The results from the scheme denoted as enhancement I are shown as line 7200. The results from the scheme denoted as enhancement II are shown as line 7300. Both enhancements significantly outperformed the baseline scheme. Enhancement II performed the best in the operative embodiment utilized. Relative performance improvements demonstrated by both enhancement schemes held as experiments were conducted with different demand sets.

Thus, certain exemplary embodiments provide a method comprising: in a network at a node located on a label switched path: selecting an optimized backup path to respond to a failure; and for each link along the backup path, reserving a backup bandwidth, wherein the backup bandwidth is sufficient to reroute traffic around the failure. As used herein, the term "respond" means to reply to a query.

Figure 8:
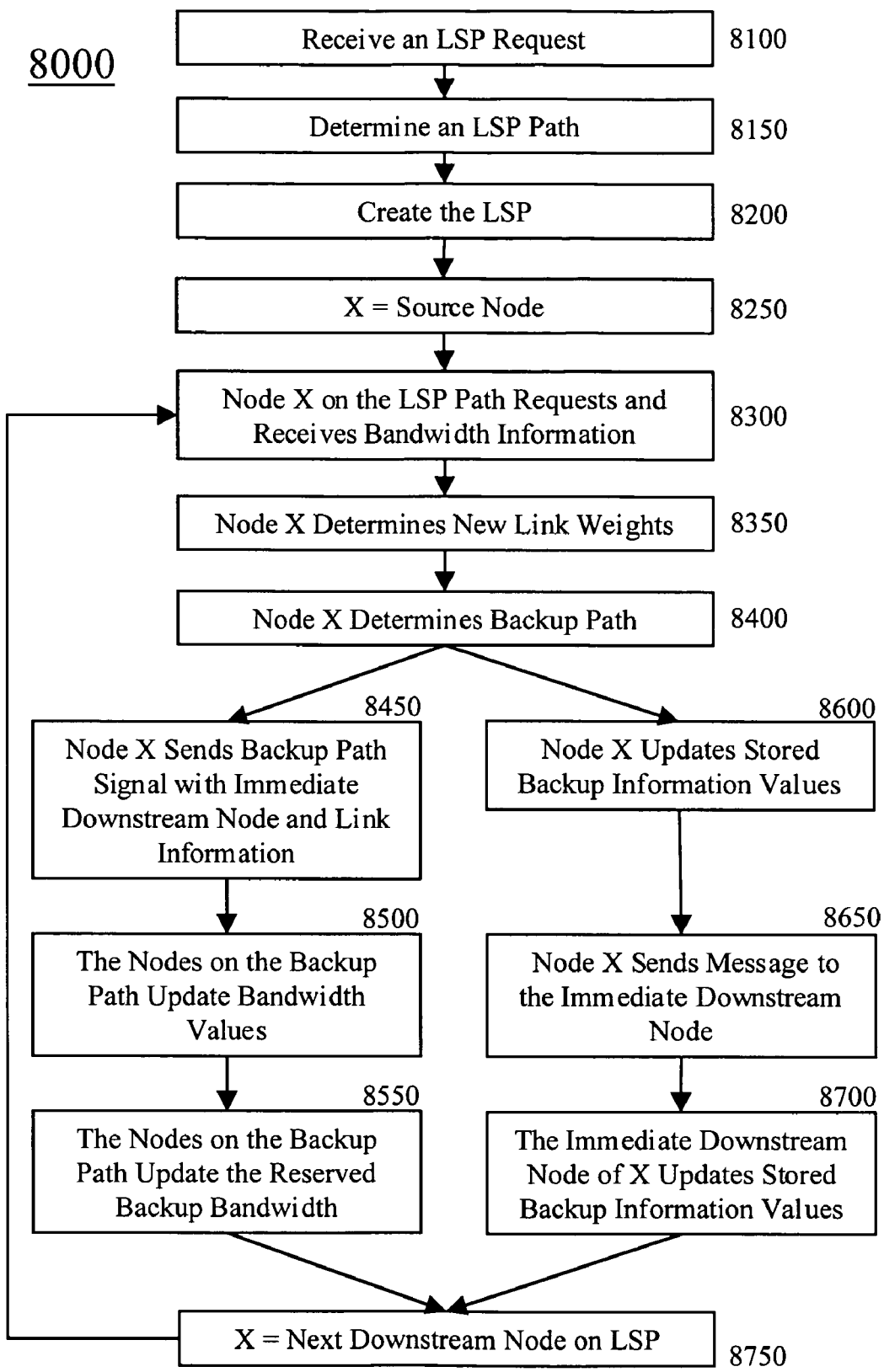
FIG. 8 is a flow diagram of an exemplary embodiment of a method 8000 for provisioning backup label switched paths in a network for rerouting traffic around a failure should the failure occur.

FIG. 8 is a flow diagram of an exemplary embodiment of a method 8000 for provisioning and/or preparing a network for rerouting traffic around a failure. As used herein, the term "link-coupled" means communicatively coupled via a link. A network can comprise a plurality of link-coupled nodes. As used herein, the term "non-terminal node" means a node on a network label switched path that is not an ultimate source or ultimate recipient of a message outside of the network.

In certain exemplary embodiments, backup paths can be calculated at each non-terminal node located on a label switched path. A total of n-1 backup paths can be determined for a label switched path having n nodes. Each non-terminal node can calculate a backup path to reroute network traffic in the event of a predetermined failure of a respective node (other than the destination node) and/or link immediately downstream of the non-terminal node on the label switched path. The label switched path can be one of a plurality of label switched paths in the network. Each label switched path can comprise a sub-plurality of network nodes. That is, the nodes comprising the label switched path can be less than all the nodes of the network. The network can be an IP network, a multiple protocol label switching (MPLS) network, a generalized multiple protocol label switching (GMPLS) network, and/or the Internet, etc. In certain exemplary embodiments, method 8000 can be implemented utilizing a centralized server. Method 8000 can be implemented for link failure, node failure, and/or shared risk link failure since the optimized backup path can be link, node, and shared risk link disjoint from the label switched path.

At activity 8100, a request for a label switched path can be received from a user of an information device communicatively coupled to a source node. As used herein, the term "communicatively coupled" means linked in a manner that facilitates communications. The request for the label switched path can comprise information related to service such as a quality of service, cost of service, and/or requested bandwidth, etc.

At activity 8150, the label switched path can be determined. In determining the label switched path, link weights can be determined, sent, and/or received. Link weights can be established initially by a specification of a network administrator, a network policy, and/or dynamic responses to broadcast queries by network nodes, etc. In certain exemplary embodiments, link weights can be provided to a particular node in the network. The link weights can be broadcast across the network to other nodes from the particular node, such as via OSPF and/or IS-IS routing protocol, etc. The source node can select the label switched path via any algorithm using the link weight such as Dijkstra's algorithm.

At activity 8200, the source node can send a label switched path creation signal (such as, e.g., a PATH message in RSVP-TE) to the destination along the selected label switched path. Responsive to the creation signal, a return signal (such as, e.g., an RESV message) can be sent from the destination node to the source node of the label switched path to confirm creation of the label switched path.

At and after activity 8250, any node along the label switched path, except the destination node, can perform a plurality of activities sequentially, partially in parallel, and/or substantially in parallel with respect to other nodes and/or other activities. For illustrative purposes, certain exemplary embodiments can be conceptualized by considering an iterative process beginning with the source node of the label switched path assigned to be node X in method 8000.

At activity 8300, the node X can send a message, such as an ASK message, to the immediately downstream node. In response, the immediately downstream node can return to node X a message, such as a REPLY message, that contains failure related information regarding an immediately downstream node failure and/or an immediately downstream link failure if the immediately downstream node is the master node of the immediately downstream link.

At activity 8350, node X can reset link weights used in exemplary embodiments to determine an optimized backup path for the label switched path. Information used in resetting link weights can be received and/or collected from node X's immediately downstream nodes. In certain exemplary embodiments, link weights can be determined according to a formula:

$$w[i] = \begin{cases} \min(b, T[i]+b-R[i]) \cdot W[i] & \text{if } T[i]+b-R[i] > 0 \text{ and } i \notin \{DR\} \\ \varepsilon & \text{if } (T[i]+b-R[i] \leq 0 \text{ or } i \in \{DP\}) \text{ and } i \notin \{DR\} ; \\ \infty & \text{if } i \in \{DR\} \end{cases}$$

where:
T[i]=max(Failself(DR)[i], Failself(DL)[i]);
Failself(DR)[i] a necessary bandwidth on link i to reroute traffic associated with all label switched paths affected by the failure of DR;
Failself(DL)[i] a necessary bandwidth on link i to reroute traffic associated with all label switched paths affected by the failure of DL;
DR is the immediately downstream node of the non-terminal node along the label switched path;
DL is a link between the non-terminal node and node DR;
{DR} is a set of links adjacent to node DR;
{DP} is a set of links between the non-terminal node and the destination node of the label switched path;
R[i] is a bandwidth reserved for link i to reroute traffic responsive to a single failure in the network;
b is the requested bandwidth of the label switched path;
W[i] is a prior weight for link i;
$\varepsilon$ is a small, non-zero weight in favor of selection of link i; and
w[i] is a modified weight associated with a link i.

At activity 8400, node X can determine the optimized backup path of the label switched path to reroute traffic around the immediately downstream link and/or immediately downstream node from node X in event of a failure. The algorithm used for the backup path can be any path optimizing algorithm and/or shortest path algorithm, such as Dijkstra's algorithm, utilizing the new resetting link weights from activity 8350.

At activity 8450, node X can send a bandwidth reservation signal along the selected optimized backup path. As used herein, the term "bandwidth reservation signal" means a message requesting that transmission capacity on a link be set aside for a predetermined purpose. The bandwidth reservation signal can comprise information regarding the immediately downstream link and/or the immediately downstream node of node X.

At activity 8500, each node along the optimized backup path can use the optimized backup path to update respective bandwidth related values, such as Failother arrays, for each node responsible for bandwidth reservation on a respective unidirectional link of the optimized backup path. For example, using a Failother array: Failother[i]=Failother[i]+b, where i is the predetermined failure carried in the reservation message and b is the bandwidth of the label switched path. As used herein, the term "previously stored" means resident in a memory at a prior time. In certain exemplary embodiments, reserving a backup bandwidth can comprise changing a value, responsive to a message requesting creation of the backup path, by adding a bandwidth associated with the optimized backup path to a previously stored value of a bandwidth associated with the predetermined failure.

At activity 8550, each node along the backup path can reserve backup bandwidth on respective links, the reserved backup bandwidth sufficient and necessary to reroute traffic around any predetermined failure. The reserved backup bandwidth can be determined by: R=max(Failother[i]) where i can have a range over all possible predetermined failures. As used herein, the term "confirmation" means a verifying acknowledgment.

In certain exemplary embodiments, the nodes along the backup path can send a confirmation message regarding backup path creation and/or bandwidth reservation. In certain exemplary embodiments, the network can be flooded with information indicative of the reserved backup bandwidth for each unidirectional link.

At activity 8600, if node X is a master node of an immediately downstream link, node X can update stored information regarding bandwidths reserved in event of a failure of the immediately downstream link, e.g., update a Failself array as: Failself[i]=Failself[i]+b, where i can have a range over all unidirectional links along the optimized backup path and b is the label switched path bandwidth.

At activity 8650, node X can send a message to a node immediately downstream of the non-terminal node X on the label switched path that comprises information regarding the optimized backup path.

At activity 8700, after the downstream node of node X receives the message comprising the optimized backup path information, if the downstream node is the master node of the immediately downstream link of node X, this node can update values related to a possible failure of node X's immediately downstream link, e.g., a Failself array, Failself[i]=Failself[i]+b, where i can range over all unidirectional links along the optimized backup path and b is the label switched path bandwidth. If node X is not the destination node of the label switched path, node X can update the stored failure related information values, e.g., for the Failself array.

At activity 8750, a new node X can be incrementally considered. For example, node X can be incremented to be a node further along the label switched path from a prior node X. Activities 8300 through 8750 can be repeated iteratively until the destination node of the label switched path is reached. The iterative procedure of method 8000 is for illustrative purposes only.

Figure 9:
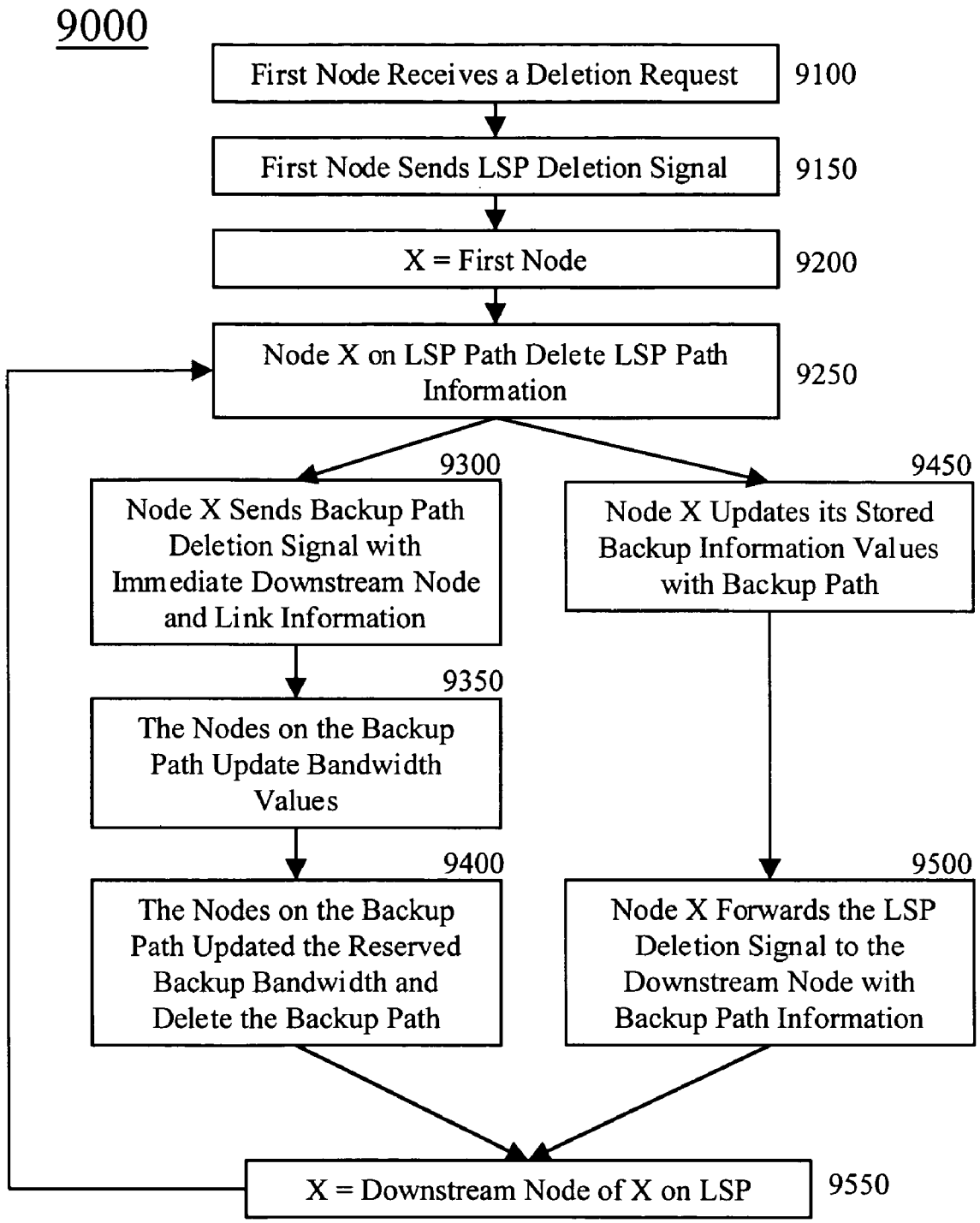
FIG. 9 is a flow diagram of an exemplary embodiment of a method 9000 for updating a network for deletion of a label switched path, wherein the network is adapted to reroute traffic around a failure should the failure occur.

FIG. 9 is a flow diagram of an exemplary embodiment of a method 9000 for updating a network for deletion of a label switched path, wherein the network is adapted to reroute traffic around a failure should the failure occur. At activity 9100, a source node on the label switched path can receive a request to delete the label switched path.

At activity 9150, the source node can send a deletion message to non-terminal nodes on the label switched path. The deletion message can be in the form of a label switched path deletion signaling message (such as, e.g., a PATHTEAR message).

At and/or after activity 9200, any node along the label switched path, except the destination node, can perform a plurality of activities sequentially, partially in parallel, and/or substantially in parallel with respect to other nodes and/or other activities. For illustrative purposes, certain exemplary embodiments can be conceptualized by considering an iterative process beginning with the source node of the label switched path as node X in method 9000.

At activity 9250, node X removes any information stored related to the deleting label switched path.

At activity 9300, node X can send a deletion message along the optimized backup path associated with the label switched path. The deletion message can comprise information regarding the immediately downstream link and/or the immediately downstream node from node X on the label switched path.

At activity 9350, each node along the optimized backup path can delete the optimized backup path from memory and update respective bandwidth values, such as Failother arrays, for each node responsible for bandwidth reservation on a respective unidirectional link of the optimized backup path. For example, by determining: Failother[i]=Failother[i]−b, where i is the predetermined failure carried in the reservation message and b is the bandwidth of the label switched path.

At activity 9400, each node along the backup path can modify reserved backup bandwidths on respective links such that bandwidth is sufficient and necessary to reroute traffic around any predetermined failure. For example, the reserved backup bandwidth can be determined by: R=max(Failother[i]) where i can have a range over all possible predetermined failures. In certain exemplary embodiments, the nodes along the backup path can send a confirmation message regarding backup path deletion and/or bandwidth reservation. In certain exemplary embodiments, the network can be flooded with information indicative of each reserved backup bandwidth for each predetermined link.

At activity 9450, if node X is a master node of an immediately downstream link, node X can update stored information regarding bandwidths reserved in event of a failure of the immediately downstream link, e.g., update a Failself array as: Failself[i]=Failself[i]−b, where i can have a range over all unidirectional links along the optimized backup path and b is the label switched path bandwidth.

At activity 9500, node X can send a deletion message to a node immediately downstream of the non-terminal node X on the label switched path that comprises information regarding the optimized backup path and the deletion thereof.

At activity 9550, after the downstream node of node X receives the deletion message comprising the optimized backup path information, if the downstream node is the master node of the immediately downstream link of node X, this node can update values related to a possible failure of node X's immediately downstream link, e.g., a Failself array, Failself[i]=Failself[i]−b, where i can range over all unidirectional links along the optimized backup path and b is the label switched path bandwidth. If node X is not the destination node of the label switched path, node X can update stored failure related information values, e.g., the Failself array.

At activity 9600, a new node X can be incrementally considered. For example, node X can be incremented to be a node further along the label switched path from a prior node X. Activities 9300 through 9550 can be repeated iteratively until the destination node of the label switched path is reached. The iterative procedure of method 9000 is for illustrative purposes only.

Figure 10:
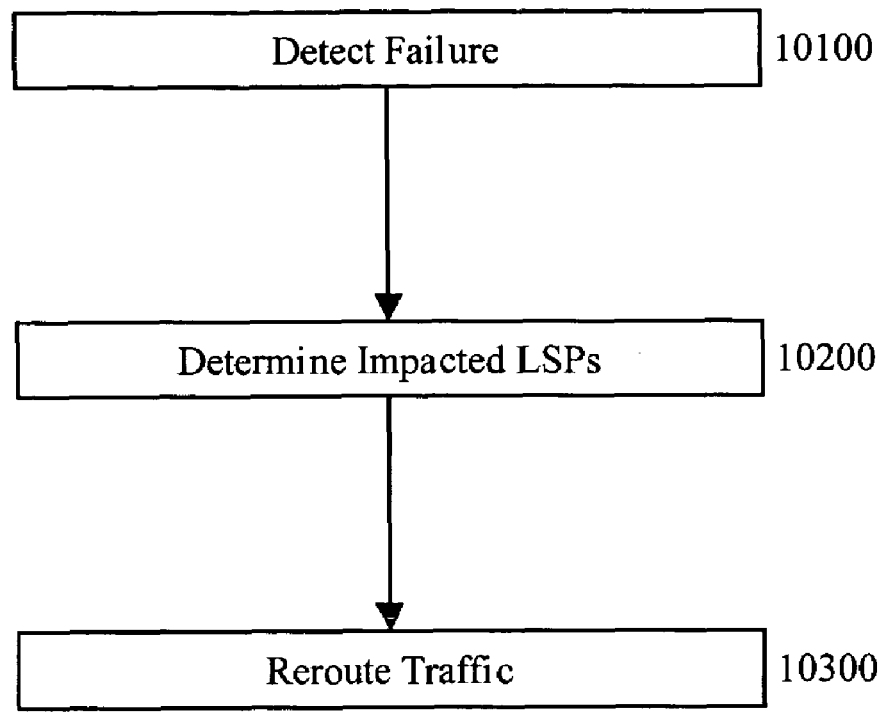
FIG. 10 is a flow diagram of an exemplary embodiment of a method 10000 for responding to a network failure.

FIG. 10 is a flow diagram of an exemplary embodiment of a method 10000 for responding to a network failure At activity 10100, a failure in the network can be detected. As used herein, the term "detecting" means an act of sensing or perceiving. The failure can interrupt service to one or more label switched paths.

At activity 10200, impacted label switched paths can be determined. As used herein, the term "impacted" means affected or subjected to an impact.

At activity 10200, network traffic can be rerouted around the failure on an optimized backup path. The optimized backup path can be associated with a label switched path impacted and/or affected by the failure.

Figure 11:
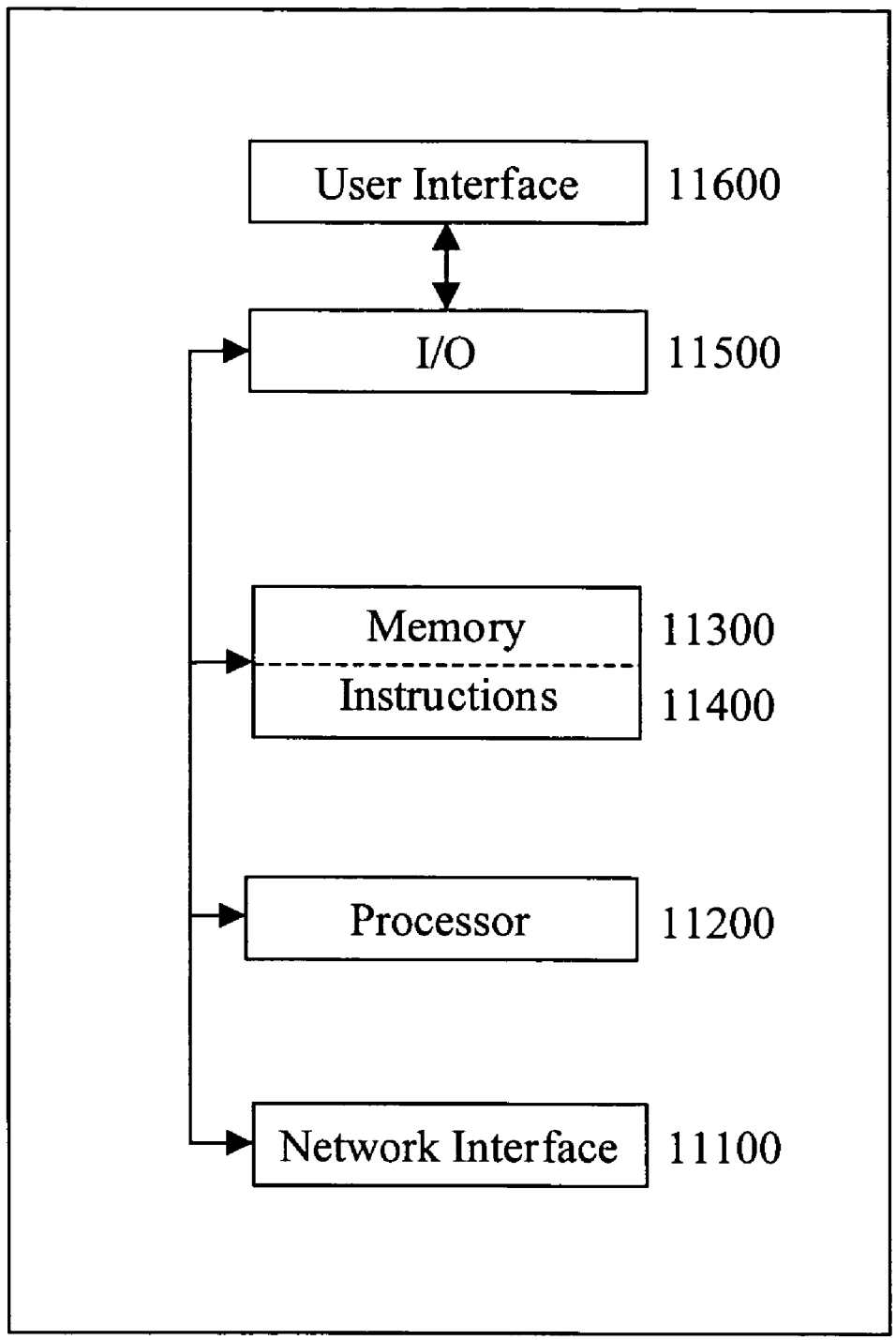
FIG. 11 is a block diagram of an exemplary embodiment of an information device 11000.

FIG. 11 is a block diagram of an exemplary embodiment of an information device 11000, which in certain operative embodiments can comprise, for example, a device comprised in nodes 1100, 1200, 1300, 1400, 1500, 1600, 1700, 1800, and 1900 of FIG. 1. As used herein, the term "machine-readable medium" means a memory readable by an information device. Information device 11000 can comprise any of numerous well-known components, such as for example, one or more network interfaces 11100, one or more processors 11200, one or more memories 11300 containing instructions 11400, one or more input/output (I/O) devices 11500, and/or one or more user interfaces 11600 coupled to I/O device 11500, etc.

In certain exemplary embodiments, via one or more user interfaces 11600, such as a graphical user interface, a user can input information related to label switched paths on network nodes or network policies.

Thus, certain exemplary embodiments provide a method comprising: in a network at a located on a label switched path: selecting a backup path to respond to a failure; and for each link along the backup path, reserving a backup bandwidth, wherein the backup bandwidth is sufficient to reroute traffic around the failure.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub-ranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method comprising:

in a network comprising a plurality of link-coupled nodes, at a non-terminal node located on a label switched path of a plurality of label switched paths in the network;

selecting an optimized backup path for rerouting traffic around a failure located immediately downstream of the non-terminal node, wherein the failure is one of a plurality of possible failures on the plurality of label switched paths, the optimized backup path comprising a subset of the plurality of link-coupled nodes of the network; and for each predetermined link of a plurality of links along the selected optimized backup path, reserving a backup bandwidth, wherein each predetermined link is comprised in a respective plurality of backup paths, wherein the backup bandwidth is sufficient to reroute traffic around a single failure on one of the plurality of label switched paths, wherein the backup bandwidth is determined by a value of a plurality of values, wherein each value of the plurality of values corresponds to a bandwidth associated with a particular failure of the plurality of possible failures, the method further comprising:

determining a link weight for use in said activity of selecting the optimized backup path, the link weight calculated according to:

$$w[i] = \begin{cases} \min(b, T[i]+b-R[i]) \cdot W[i] & \text{if } T[i]+b-R[i] > 0 \text{ and} \\ & i \notin \{DR\} \\ \varepsilon & \text{if } (T[i]+b-R[i] \leq 0 \text{ or } ; \\ & i \in \{DP\}) \text{ and } i \notin \{DR\} \\ \infty & \text{if } i \in \{DR\} \end{cases}$$

where:

T[i]=max(Failself(DR)[i], Failself(DL)[i]);

Failself(DR)[i] a necessary bandwidth on link i to reroute traffic associated with all label switched paths affected by the failure of DR;

Failself(DL)[i] a necessary bandwidth on link i to reroute traffic associated with all label switched paths affected by the failure of DL;

DR is the immediately downstream node of the non-terminal node along the label switched path;

DL is a link between the non-terminal node and node DR;

{DR} is a set of links adjacent to node DR;

{DP} is a set of links between the non-terminal node and the destination node of the label switched path;

R[i] is a bandwidth reserved for link i to reroute traffic responsive to a single failure in the network;

b is the requested bandwidth of the label switched path;

W[i] is a prior weight for link i;

$\varepsilon$ is a small, non-zero weight in favor of selection of link i; and w[i] is a modified weight associated with a link i.

\* \* \* \* \*